US008881864B2

(12) United States Patent
Starling et al.

(10) Patent No.: US 8,881,864 B2
(45) Date of Patent: Nov. 11, 2014

(54) MOTOR VEHICLE ACOUSTIC INSULATOR, METHODS OF MANUFACTURE AND USE THEREOF

(71) Applicant: International Automotive Components Group North America, Inc., Southfield, MI (US)

(72) Inventors: Matt Starling, Huron, OH (US); John Lahl, Parma, OH (US); Rose Ann Ryntz, Clinton Township, MI (US); Terrence M. McRoberts, Holly, MI (US)

(73) Assignee: International Automation Components Group North America, Inc., Southfield, MI (US)

( * ) Notice: Subject to any disclaimer, the term of this patent is extended or adjusted under 35 U.S.C. 154(b) by 0 days.

(21) Appl. No.: 13/645,288

(22) Filed: Oct. 4, 2012

(65) Prior Publication Data

US 2014/0097035 A1    Apr. 10, 2014

(51) Int. Cl.
| | |
|---|---|
| *E04B 1/82* | (2006.01) |
| *B60R 13/08* | (2006.01) |
| *G10K 11/168* | (2006.01) |
| *G10K 11/00* | (2006.01) |
| *B32B 5/22* | (2006.01) |
| *E04B 1/74* | (2006.01) |

(52) U.S. Cl.
CPC .......... *G10K 11/002* (2013.01); *B60R 13/0823* (2013.01); *G10K 11/168* (2013.01); *B32B 5/22* (2013.01)
USPC .......... 181/290; 181/294; 181/296; 296/39.3; 427/407.1

(58) Field of Classification Search
CPC .. B60R 13/08; B60R 13/0815; B60R 13/083; B60R 13/0838; G10K 11/16; G10K 11/168; B62D 33/0604; B05D 1/02
USPC ................ 181/290, 294, 296, 286, 284, 204; 296/39.3; 427/327.2, 402, 407.1
See application file for complete search history.

(56) References Cited

U.S. PATENT DOCUMENTS

| | | | |
|---|---|---|---|
| 5,922,265 | A | 7/1999 | Parekh |
| 6,695,374 | B1 | 2/2004 | Gebreselassie et al. |
| 6,971,475 | B2 * | 12/2005 | Tompson et al. ............. 181/204 |
| 6,974,172 | B2 | 12/2005 | Gebreselassie et al. |
| 7,017,250 | B2 | 3/2006 | Gebreselassie et al. |
| 7,070,848 | B2 * | 7/2006 | Campbell ..................... 428/137 |

(Continued)

FOREIGN PATENT DOCUMENTS

EP          0 882 561  A1    12/1998

*Primary Examiner* — Edgardo San Martin

(74) *Attorney, Agent, or Firm* — Grossman, Tucker, Perreault & Pfleger, PLLC

(57) ABSTRACT

An acoustic insulator for a motor vehicle is provided comprising a mass providing an acoustic barrier and a spring providing an acoustic absorber overlying the mass. The mass comprises a first acoustic mass layer underlying a second acoustic mass layer. The first acoustic mass layer is provided by a thermoplastic sheet having a thickness in a range of 0.5 mm to 1 mm. The second acoustic mass layer is provided at one or more localized areas formed in place on a backside surface of the first acoustic mass layer to increase an overall thickness of the mass at the one or more localized areas. The spring layer is formed in place on a backside of the second acoustic mass layer and the backside of the first acoustic mass layer.

24 Claims, 4 Drawing Sheets

(56) References Cited

U.S. PATENT DOCUMENTS

| | | | |
|---|---|---|---|
| 7,677,358 B2* | 3/2010 | Tocchi et al. | 181/290 |
| 7,971,683 B2* | 7/2011 | Bayle et al. | 181/286 |
| 8,066,097 B2* | 11/2011 | Boyadjian et al. | 181/290 |
| 8,080,193 B2 | 12/2011 | Freser-Wolzenburg et al. | |
| 2003/0096079 A1* | 5/2003 | Messina et al. | 428/85 |
| 2004/0075290 A1* | 4/2004 | Campbell | 296/39.3 |
| 2004/0188158 A1 | 9/2004 | Gebreselassie et al. | |
| 2005/0150720 A1 | 7/2005 | Tudor et al. | |
| 2005/0217933 A1* | 10/2005 | Sung Young et al. | 181/290 |
| 2006/0054385 A1* | 3/2006 | Rackers et al. | 181/290 |
| 2006/0246799 A1* | 11/2006 | Messina et al. | 442/120 |
| 2007/0281095 A1* | 12/2007 | Hoefflin et al. | 427/372.2 |
| 2008/0264555 A1 | 10/2008 | Blomeling | |
| 2009/0277716 A1* | 11/2009 | Eadara et al. | 181/290 |
| 2011/0221223 A1 | 9/2011 | Mizata | |
| 2014/0000980 A1* | 1/2014 | Carson et al. | 181/290 |
| 2014/0008146 A1* | 1/2014 | Fuhrmann et al. | 181/294 |

\* cited by examiner

MOTOR VEHICLE ACOUSTIC INSULATOR, METHODS OF MANUFACTURE AND USE THEREOF

FIELD OF THE INVENTION

This disclosure relates to a motor vehicle acoustic insulator, methods of manufacture and use thereof. More particularly, this disclosure relates to an acoustic insulator with mass and spring, methods of manufacture and the use thereof.

BACKGROUND

From EP 0 882 561 A1 there is known a method for the production of a sound insulation molding with mass and spring, with which both the mass and the spring are produced from molded polyurethane. For the formation of a mass, reaction substances and fillers are sprayed or injected into a mold cavity and brought to reaction, whereby by means of a closed mold, there is attained a forming of the mass. After changing the lid of the mold, foam is then formed in the mold cavity, as a spring on the mass, and this by means of a second molding through which the mass layer is foamed on the back.

However, EP 0 882 561 A1 fails to recognize the high cost of tooling for the processes disclosed therein. As set forth above, a mold construction comprising a mold cavity with two separate (male) lids is required, one lid is required to form the backside of the mass, while the other lid is required to form the backside of the spring. Furthermore, as a result of having to use a single mold (female) cavity in combination with two lids, the cycle time essentially doubles with such use of the mold cavity. Thus, particularly for higher volume production, multiple sets of molds may be required due to the increased cycle time to meet production demand, further increasing tooling costs.

Furthermore, once the molds are formed, it is not possible to provide increased sound attenuation/damping in newly uncovered/discovered locations of the acoustic insulator requiring increased sound attenuation/dampening without modification of the molds. Thus, changes in the acoustic insulator on the fly from part-to-part are not possible.

What is needed in a method of producing an acoustic insulator which overcomes the high tooling costs and inability to quickly change a sound attenuation profile of the acoustic insulator of the art, particularly from one part to the next part to support high volume manufacturing.

SUMMARY

An acoustic insulator, particularly for a motor vehicle dash, is provided comprising a mass providing an acoustic barrier and a spring providing an acoustic absorber. The mass further comprises a first acoustic mass layer underlying a second acoustic mass layer.

The first acoustic mass layer is provided by a thermoplastic sheet having a thickness in a range of 0.5 mm to 1 mm. The thermoplastic sheet may be at least one of vacuum-formed and thermo-formed. The thermoplastic may comprise a vinyl acetate polymer, such as an ethylene-vinyl acetate copolymer and/or vinyl chloride polymers.

The second acoustic mass layer is provided at one or more localized areas formed in place on a backside surface of the first acoustic mass layer to increase an overall thickness of the mass at the one or more localized areas. The thickness of the second acoustic mass layer may vary to vary localized acoustical properties of the mass according to a sound profile of the motor vehicle. The second acoustic mass layer may have a thickness in a range of 1 mm to 10 mm.

The second acoustic mass layer may comprise a composition which is spray formed in place on the backside of the first acoustic mass layer at a plurality of localized areas. Furthermore, the second acoustic mass layer spray formed in place on the backside of the first acoustic mass layer may be spray formed in place without use of a forming surface other than the backside surface of the first acoustic mass layer. Moreover, the second acoustic mass layer composition spray formed in place on the backside of the first acoustic mass layer may be formed in place from reactive components which react to form a thermoset polymer. As such, the second acoustic mass layer may be bonded directly to the backside surface of the first acoustic mass layer.

The spring layer overlies the mass, and is formed in place on a backside of the second acoustic mass layer and/or the backside of the first acoustic mass layer. The spring layer may comprise a composition which is spray formed in place on the backside of the first acoustic mass layer and the backside of the second acoustic mass layer. Furthermore, the spring layer spray formed in place on the backside of the first acoustic mass layer and the backside of the second acoustic mass layer may be spray formed in place without use of a forming surface other than the backside surface of the first acoustic mass layer and/or the backside surface of the second acoustic mass layer. Moreover, the spring layer spray formed in place on the backside of the first acoustic mass layer and/or the backside of the second acoustic mass layer may be formed in place from reactive components which react to form a thermoset polymer. As such, the spring layer may be bonded directly to the backside surface of the first acoustic mass layer and/or the backside surface of the second acoustic mass layer. The thermoset polymer may be a foam.

A method of providing an acoustic insulator for a motor vehicle is also provided, comprising forming a first acoustic mass layer of a mass which provides an acoustic barrier, wherein the first acoustic mass layer is formed by at least one of thermo-forming and vacuum-forming a thermoplastic sheet having a thickness in a range of 0.5 mm to 1 mm; forming a second acoustic mass layer of the mass in place on a backside surface of the first acoustic mass layer at one or more localized areas to increase an overall thickness of the mass at the one or more localized areas, and forming a spring layer which provides an acoustic absorber overlying the mass, wherein the spring layer is formed in place on a backside of the second acoustic mass layer and/or the backside of the first acoustic mass layer.

The second acoustic mass layer may be spray formed in place on the backside of the first acoustic mass layer at a plurality of localized areas. Furthermore, the second mass spray formed in place on the backside of the first acoustic mass layer may be spray formed in place without use of a forming surface other than the backside surface of the first acoustic mass layer. Moreover, the second acoustic mass layer spray formed in place on the backside of the first acoustic mass layer may be formed in place from reactive components which react to form a thermoset polymer.

The spring layer may also be spray formed in place on the backside of the first acoustic mass layer and/or the backside of the second acoustic mass layer. Furthermore, the spring layer spray formed in place on the backside of the first acoustic mass layer and/or the backside of the second acoustic mass layer may be spray formed in place without use of a forming surface other than the backside surface of the first acoustic mass layer and the backside surface of the second acoustic mass layer. Moreover, the spring layer spray formed in place on the backside of the first acoustic mass layer and the backside of the second acoustic mass layer may be formed in place from reactive components which react to form a thermoset polymer.

The method may further comprise changing at least one of a thickness and location of the second acoustic mass layer to change a sound attenuation of the acoustic insulator without modification of any tooling used to produce the acoustic insulator. Also, the method may further comprise changing a thickness of the spring layer to change a sound attenuation of the acoustic insulator without modification of any tooling used to produce the acoustic insulator.

FIGURES

The above-mentioned and other features of this disclosure, and the manner of attaining them, will become more apparent and better understood by reference to the following description of embodiments described herein taken in conjunction with the accompanying drawings, wherein.

Figure 1:
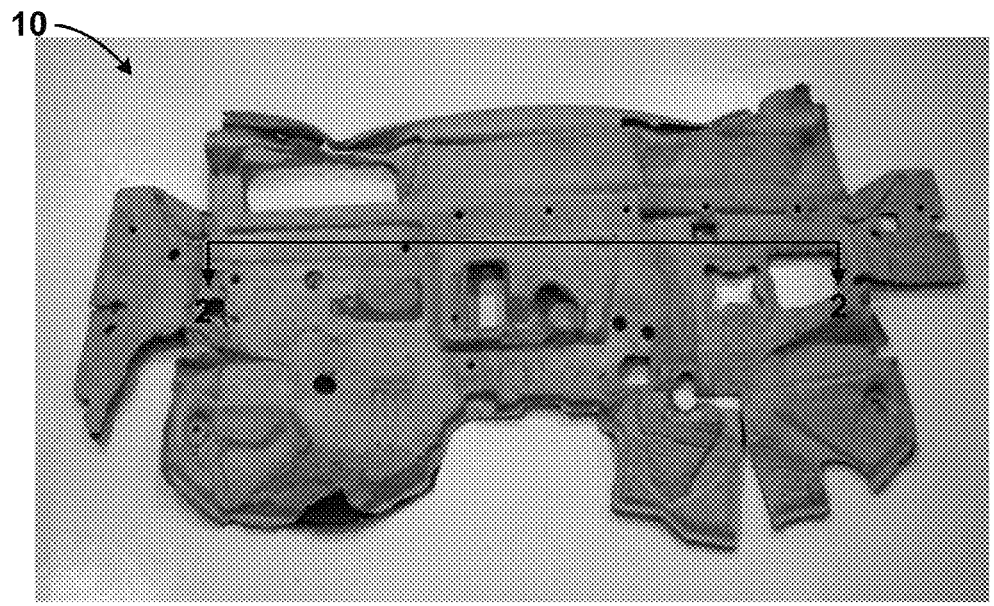
FIG. 1 shows a plan view of an acoustic insulator according to the present disclosure.
Figure 3:
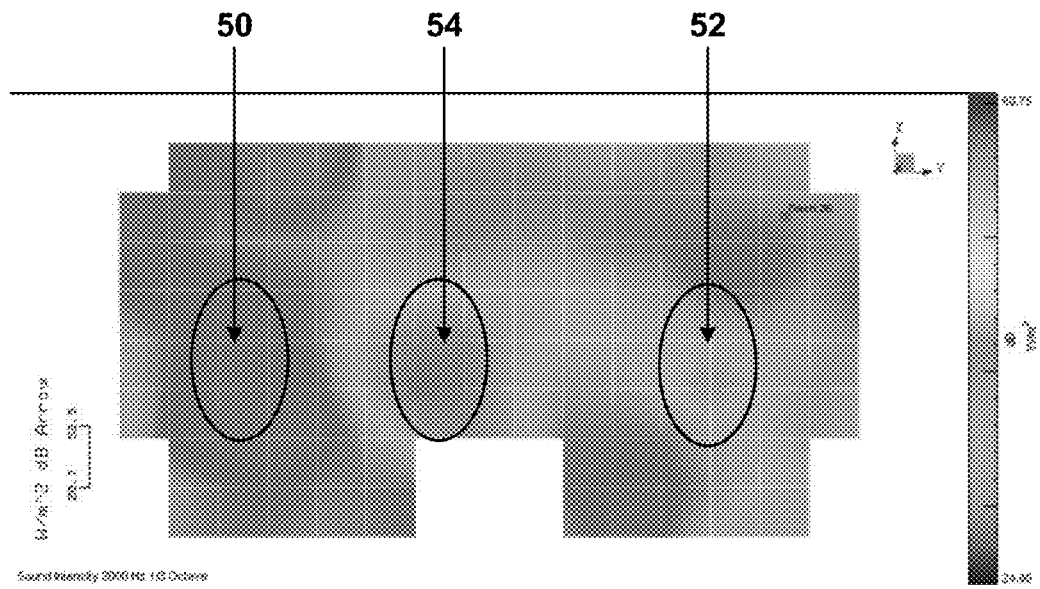
FIG. 3 shows a sound intensity profile for the acoustic insulator of FIG. 1 in response to sound generation at a particular frequency by a sound generator in the form of a motor vehicle engine.
Figure 5:
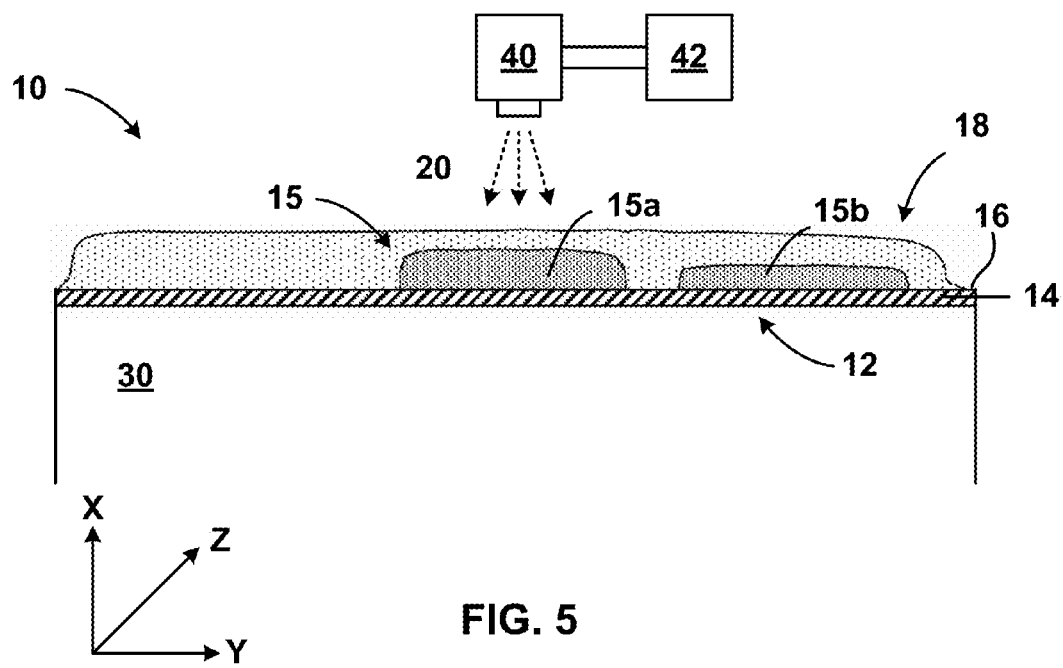
Figure 6:
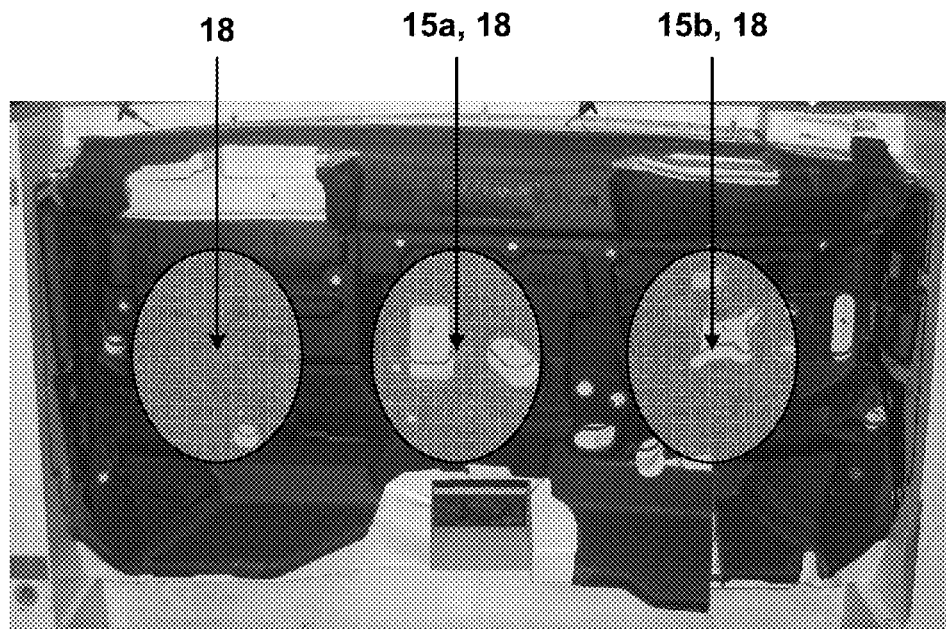
Figure 7:
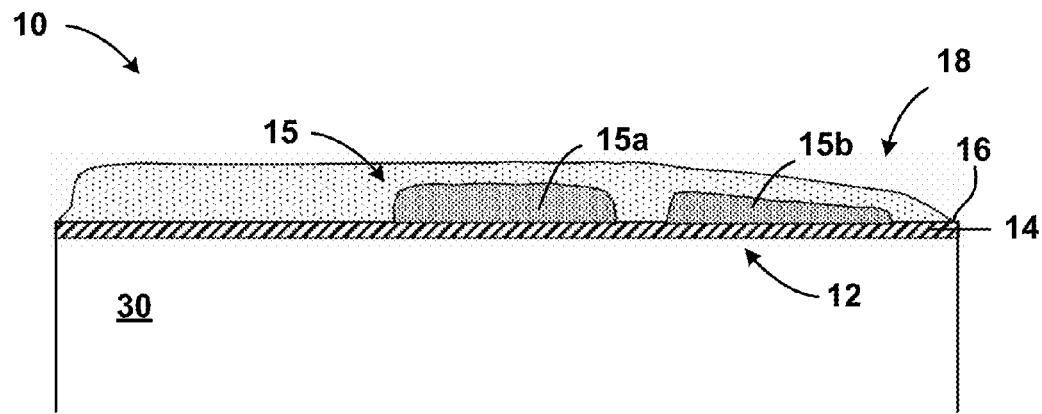
Figure 8:
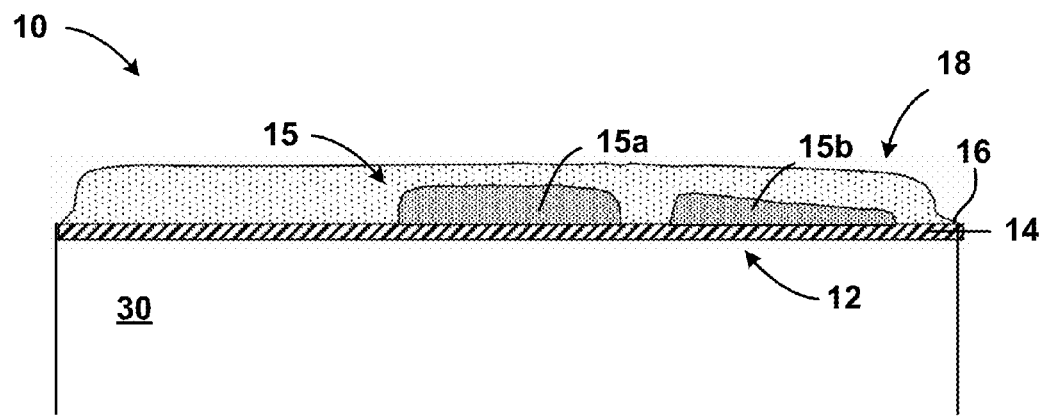
Figure 9:
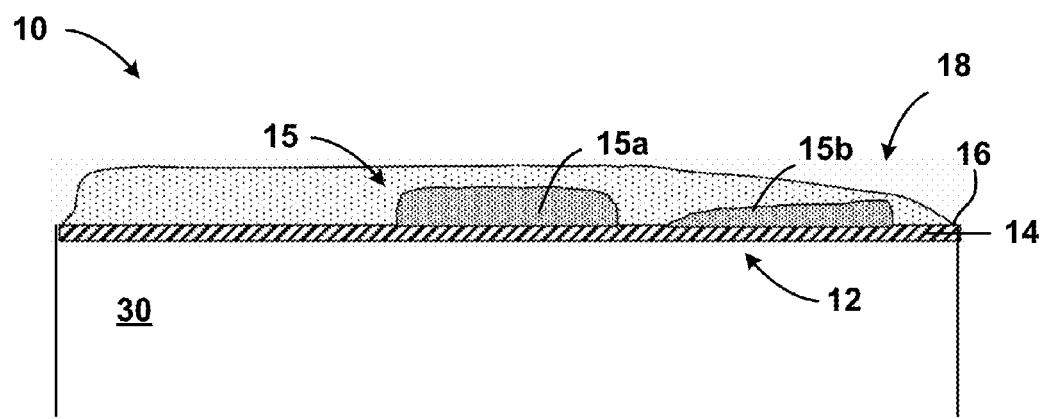

FIG. 5 shows a cross-sectional view of the acoustic insulator of FIG. 1 during formation of an acoustic absorber (spring) layer in overlying relationship relative to the first acoustic mass layer and the second acoustic mass layer; and FIG. 6 shows a plan view of the acoustic insulator of FIG. 1. with the locations of the second acoustic mass layer and acoustic absorber corresponding to the high sound generation areas of the sound intensity map of FIG. 3;

FIG. 7 shows another embodiment of the acoustic insulator according to the present disclosure;

FIG. 8 shows another embodiment of the acoustic insulator according to the present disclosure; and FIG. 9 shows another embodiment of the acoustic insulator according to the present disclosure.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to FIG. 1, there is shown a dash acoustic insulator 10 for a motor vehicle. As explained in greater detail below, acoustic insulator 10 may be tunable to attenuate a sound intensity profile generated by the motor vehicle by varying a thickness of one or more layers thereof in response to the sound intensity profile.

Figure 2:
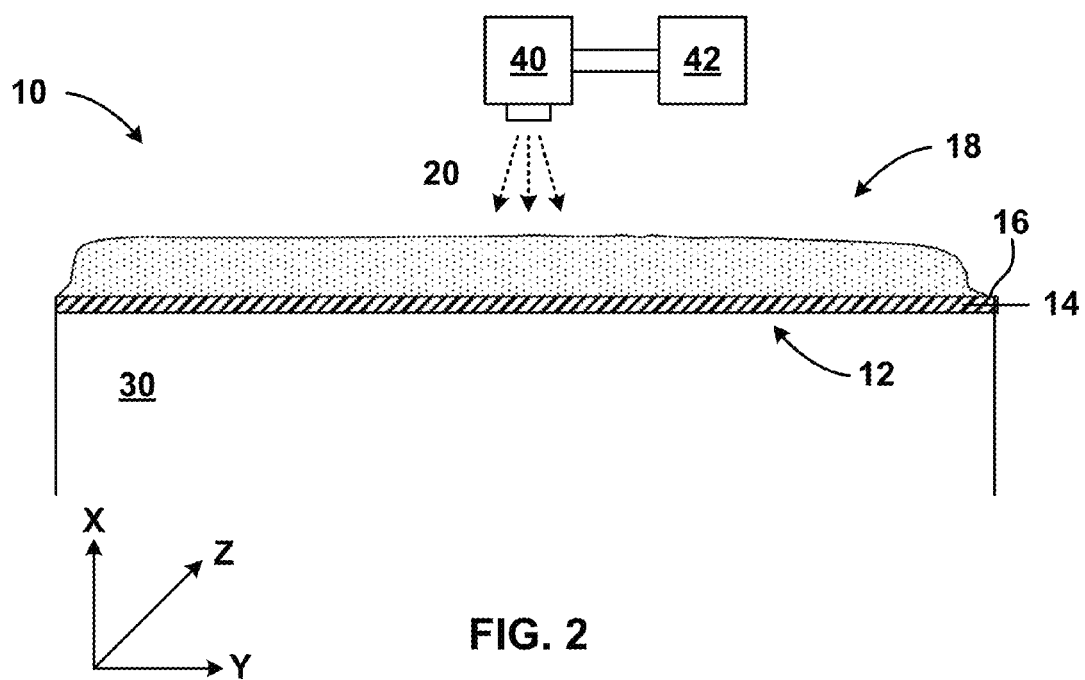
FIG. 2 shows a cross-sectional view of the acoustic insulator of FIG. 1 taken along line 2-2 of FIG. 1.

As shown in FIG. 2, acoustic insulator 10 may particularly comprise an acoustic (noise) barrier 12, which is a mass of flexible, solid (substantially non-porous), relatively dense material of high sound absorption. Acoustic insulator 10 may further comprise an acoustic (noise) absorber 18 on one side of the acoustic barrier 12, which is a spring of flexible, porous, relatively low density material, such as foam, having relatively low sound reflectance.

With regards to operation of the acoustic insulator 10, noise and other sounds, which may be particularly formed from a sound generator such as an engine, transmission/gearbox and/or tires of a motor vehicle, first enters the acoustic absorber 18. Again, because acoustic absorber 18 has low sound reflectance, the sound is captured and partially absorbed in the acoustic absorber 18 as it propagates through the acoustic absorber 18 towards the acoustic barrier 12. The remaining sound wave energy may reach the relatively dense mass of the acoustic barrier 12, where it is then attenuated by the acoustic barrier by preferably being converted to thermal energy.

Layer 14 of acoustic mass barrier 12 may particularly be formed from a flat sheet taken as a blank from a roll of thermoplastic sheetstock. The blank may be shaped by a thermo-forming/vacuum-forming process in which it is heated and drawn under vacuum to conform to the shape of a thermoforming mandrel 30.

The acoustic mass layer 14 may particularly be made of a thermoplastic elastomer such as a vinyl acetate copolymer, preferably an ethylene-vinyl acetate (EVA) copolymer, which may contain ethylene with a proportion of vinyl acetate. The ethylene-vinyl acetate (EVA) may offer increased flexibility, elongation and impact resistance as compared to polyethylene, as well as the ability to be processed as a thermoplastic. Acoustic mass layer 14 preferably has a density in the range between and including 1.4 g/cc to 2.5 g/cc and has a sheet thickness in a range between and including 0.5 mm to 1 mm. Acoustic mass layer 14 may be filled with calcium carbonate, barium sulfate, or a blend thereof at a level (% weight) in a range of and all increments between 60% to 80%, more particularly in a range of and all increments between 70% to 78%, and even more particularly in a range of and all increments between 73% to 76%. Furthermore, the weight/area of acoustic mass layer 14 may be in a range between and including 0.4 lbs/ft$^2$ to 0.6 lbs/ft$^2$, particularly 0.5 lbs/ft$^2$.

Other materials for acoustic mass layer 14 may include vinyl chloride polymers, such as plasticized (flexible) polyvinyl chloride sheetstock.

While the use of sheetstock for acoustic mass layer 14 of acoustic mass barrier 12 may have certain trim waste associated with use thereof, the tooling (i.e. thermoforming mandrel 30) used to form acoustic mass layer 14 is relatively inexpensive, particularly as compared to the tooling costs of forming processes where the acoustic mass barrier may be formed in a pre-defined cavity, such as that which may be provided by a thermoplastic injection mold, thermoset reaction injection mold, a compression mold or some other mold particularly having two opposing mold halves which form a pre-defined cavity.

Acoustic absorber 18 may be spray applied to the underlying backside surface 16 of the acoustic mass layer 14. The acoustic absorber 18 may be formed from reactant components 20, preferably a polyol and an isocyanate to form a polyurethane foam, which are high pressure mixed and introduced to the backside surface 16 of the acoustic mass layer 14, through a movable mixhead 40 which is manipulated by a computer controlled robot 42 in multiple planes, such as the X, Y and Z planes. In such a manner, the acoustic absorber 18 may be formed without a skin, or a thinner skin, which may be associated with closed mold foaming processes.

Thus, the acoustic absorber 18 preferably comprises a sprayable thermosetting material formed in place on the backside 16 of the acoustic mass layer 14, particularly without use of a mold or other forming surface other than the surface 16 of the acoustic mass layer 14 to which it is applied. The acoustic absorber 18 may have a thickness in a range of and all increments between 0.5 mm to 10 mm, and more particularly in a range of and all increments between 1 mm to 5 mm, and even more particularly in a range of and all increments between 1.5 mm to 3 mm.

An exemplary polyurethane foam for acoustic absorber 18 may have the following formulation (% by weight):

| Components | % by weight |
|---|---|
| Polyol Side | |
| Polyol blend (combination of polyether triols or polyether diols) | 80 to 95 |
| Water ($H_2O$) | 2.0 to 6. |
| Combination of amine catalysts | 0.5 to 3.0 |
| Silicone Surfactant | 0.3 to 2. |
| Pigment dispersion | 1.0 to 4.0 |
| Isocyanate Side | |
| Polymeric methylene diphenyl diisocyanate (MDI) or an MDI variant, or MDI pre-polymer | |
| NCO/OH ratio (index) | 0.5 to 0.9 (65 to 100 index) |

The above polyol formulation will then be reacted with the isocyanate-polymeric MDI or an MDI variant or MDI pre-polymer. Average functionality for MDI ranging from 2.3 to 3.1 to provide optimum physical properties/density. Functionality of flexible polyol formulation is 2.0 to 3.5.

The reactivity profile for the foregoing polyurethane foam formulation may be as follows:

| | |
|---|---|
| Cream time, seconds | 3 to 10 |
| Gel time, seconds | 20 to 30 |
| End of rise time, seconds | 40 to 60 |
| Tack free time, seconds | 80 to 120 |
| De-mold time, seconds | 80 to 120 |

The foam may have a free rise density in the range of 0.032 to 0.046 g/cc, and an open cell content in the range of 20-70%. Physical properties may include:

| | |
|---|---|
| Elongation at yield, ASTM 3574 Test E (2011) | 70 to 120% |
| Tear Strength at yield, ASTM 3574 Test E (2011) | 120 to 180 kPA |
| Compression Set (ASTM 3574 Test D (2011)) | 10 to 25% |

With the foregoing process, the acoustic absorber 18 is bonded directly to the acoustic mass layer 14. While the thickness of the acoustic absorber 18 is shown to be substantially uniform, the thickness of the acoustic absorber 18 overlying the acoustic mass layer 14 may vary according to the sound intensity profile of the motor vehicle. Furthermore, the robot 42 can be re-programmed to change thickness of the acoustic absorber 18 from part to part without any tooling change.

After acoustic insulator 10 is formed, acoustic insulator 10 may be placed in the vehicle, or a simulated vehicle, to test the sound attenuation properties thereof. Referring now to FIG. 3, there is shown a sound intensity profile based on the sound attenuation properties of the acoustic insulator of FIGS. 1 and 2.

As shown, sound intensity measurements show a relatively low sound intensity in the range of 40 decibels for most of the area of acoustic insulator 10, which includes area 50 (but not areas 52 and 54). However, the sound intensity measurements increase to a range of 50 decibels for area 52 of acoustic insulator 10, and further increase to a range of 56 decibels for area 54 of acoustic insulator 10.

Figure 4:
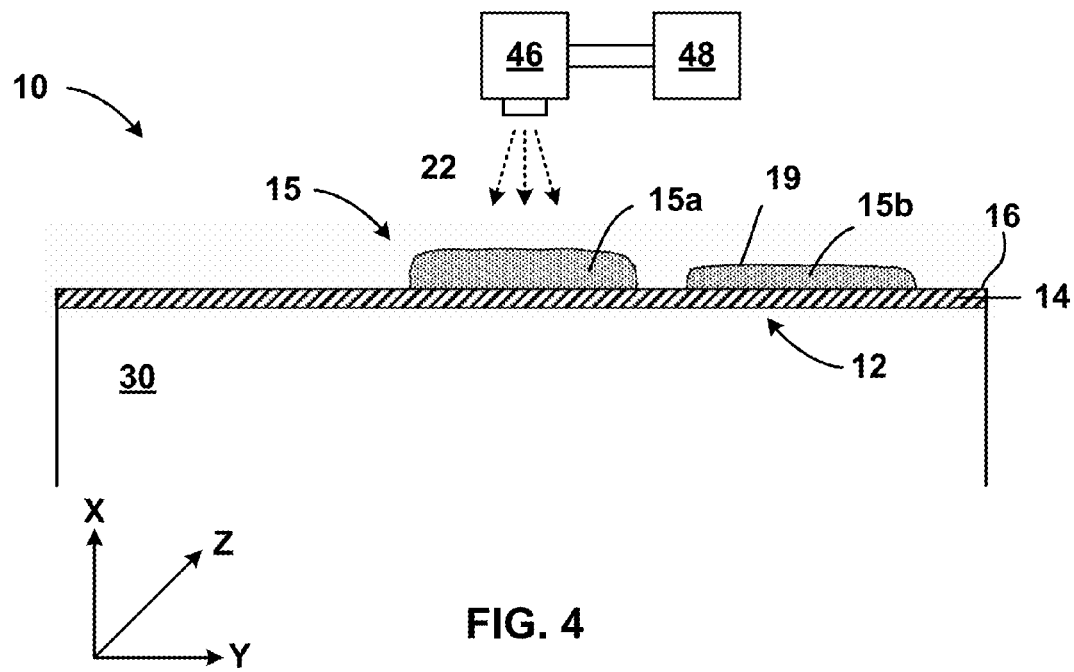
FIG. 4 shows an embodiment of the acoustic insulator of FIG. 1 during formation of a second acoustic mass layer in overlying relationship relative to the first acoustic mass layer, particularly in high sound generation areas of the acoustic intensity profile.

Now, with reference to FIG. 4, in order to lower the sound intensity of hot spots 52 and 54, acoustic mass barrier 12 may particularly comprise two layers, 14 and 15, as shown by discrete (isolated) localized areas 15a and 15b, which may be formed prior to the formation of energy absorber 18 (FIG. 5). Specifically, after the first acoustic mass layer 14 is formed to continuous (full) shape of the acoustic insulator 10 to be produced, second acoustic mass layer 15 may be sprayed on underlying backside surface 16 of the first acoustic mass layer 14, particularly and only at discrete localized areas 15a and 15b.

The second acoustic mass layer 15 may be formed from reactant components 22, particularly a polyol and an isocyanate to form a solid (substantially non-porous) polyurethane, which are high pressure mixed and introduced to the backside surface 16 of the acoustic mass layer 14 through a movable mixhead 46 which is manipulated by a computer controlled robot 48 in multiple planes, such as the X, Y and Z planes. One or more filler materials for the acoustic mass layer 15, particularly in particulate form, may be located in the polyol stream.

Thus, the second acoustic mass layer 15 comprises a sprayable thermosetting material formed in place on the backside of the first acoustic mass layer 14 at a plurality of localized areas 15a, 15b without use of a mold or other forming surface other than the surface 16 of the acoustic mass layer 14 to which it is applied.

Thus, FIG. 4 illustrates an exemplary embodiment of the acoustic mass barrier 12 comprised of two discrete mass layers 14 and 15. The first acoustic mass layer 14 may define a continuous mass (carrier) layer, while the second acoustic mass layer 15 is provided at a plurality of discrete, localized areas 15a, 15b forming a discontinuous layer bonded directly to a backside of the first acoustic mass layer 14 to increase an overall thickness of the mass at the plurality of localized areas 15a, 15b.

While the thickness of the localized areas 15a, 15b are shown to be substantially uniform, the thickness of the localized areas 15a, 15b overlying the acoustic mass layer 14 may vary according to a sound intensity profile of the motor vehicle. For example, from review of FIGS. 3, 4 and 6, the thickness of localized area 15b of the second acoustic mass layer 15 may be used to further sound attenuate area 52 of acoustic insulator 10, and the further thickness increase of localized area 15a of the second acoustic mass layer 15 may be used to further sound attenuate area 54 of acoustic insulator 10.

In particular, the areas of acoustic insulator 10 solely consisting of first acoustic mass layer 14 and sound absorber 18 may have a (nominal) weight per unit area of 2.4 to 3.4 kg/m². Areas of acoustic insulator 10 consisting of first acoustic mass layer 14, second acoustic mass insulator 15b and sound absorber 18 may have a weight per unit area of 4.8 kg/m². Areas of acoustic insulator 10 consisting of first acoustic mass layer 14, second acoustic mass insulator 15a and sound absorber 18 may have a weight per unit area of 7.3 kg/m².

Similar to the prior embodiment, acoustic absorber 18 may be spray applied as a continuous layer to the underlying backside surface 16 of the first acoustic mass layer 14, as well as the backside surface 19 of the second acoustic mass layer 15. The acoustic absorber 18 may be formed from reactant components 20, particularly a polyol and an isocyanate to form a polyurethane foam, which are high pressure mixed and introduced to the backside surface 16 of the acoustic mass layer 14, through a movable mixhead 40 which is manipulated by a computer controlled robot 42 in multiple planes, such as the X, Y and Z planes.

Thus, the acoustic absorber 18 comprises a sprayable thermosetting material formed in place on the backside 16 of the first acoustic mass layer 14, as well as the backside surface of the second acoustic mass layer 15, particularly without use of a mold or other forming surface other than the surface 16 of the first acoustic mass layer 14 and second acoustic mass layer 15 to which it is applied.

The acoustic absorber 18 is bonded directly to the first acoustic mass layer 14 and/or bonded directly to the second acoustic mass layer 15. While the thickness of the acoustic absorber 18 is shown to be substantially uniform, the thickness of the acoustic absorber 18 overlying the acoustic mass layer 14 may vary according to a sound intensity profile of the motor vehicle.

It should be understood that the robots 42 and 48 can be re-programmed to change thickness and/or location of the localized areas 15a, 15b of second acoustic mass layer 15 and/or acoustic absorber 18 without any tooling change. For example, as shown in FIG. 7, the thickness of localized area 15b of the second acoustic mass layer 15 may vary while a thickness of the acoustic absorber 18 overlying the localized area 15b remains constant. In FIG. 8, the thickness of localized area 15b of the of the second acoustic mass layer 15 may vary (decrease) while the thickness of the acoustic absorber 18 overlying the localized area 15b correspondingly varies (increases) whereby the overall thickness of both layers 15b, 18, as well as the acoustic insulator 10, remains constant. In FIG. 9, the thickness of localized area 15b of the of the second acoustic mass layer 15 may vary (decrease) while the thickness of the acoustic absorber 18 overlying the localized area 15b also varies (increases) whereby the overall thickness of two layers 15b, 18, as well as the acoustic insulator 10, increases. It should be understood that the robots 42 and 48 may be re-programmed to change thickness of the second acoustic mass layer 15 and/or the acoustic absorber 18 from part-to-part in sequence without any tooling change. Thus, the thickness of the second acoustic mass layer 15b, as well as the acoustic absorber 18 may vary within and among the localized areas to vary localized acoustical properties of the mass according to a sound profile of the motor vehicle.

Thus, the present invention starts with the recognition that a sound generator, such as an engine, may transmit sound very differently to different areas of the motor vehicle structure. As such, the acoustic insulator 10 herein provides an optimal acoustic mass barrier 12/acoustic absorber 18 (i.e. mass-spring) combination for various surface regions of a surface to be sound insulated. Thus, rather than using a first acoustic mass layer 15a which is over designed (i.e. too thick) at areas of relatively low sound generation and transmission, the outlay of materials for the acoustic mass barrier 15, and correspondingly for the acoustic insulator 10 as a whole, may be reduced and optimized by tailoring the second acoustic mass layer 15b only to those regions which have relatively high sound generation and transmission.

As such, control of the spray devices 40 and 46 bring about the spraying of the second acoustic mass layer 15 (as well as the acoustic absorber 18) so that the reaction components for the formation of the second acoustic mass layer 15 (as well as the acoustic absorber 18) are precisely delivered to areas of the acoustic mass barrier 12 of relatively high sound generation and transmission in quantity and composition to meet sound attenuation requirements. The quantity of the supplied reaction components may be varied such that different thicknesses of the second acoustic mass layer 15 may be achieved at the targeted discrete areas 15a, 15b of the second acoustic mass layer 15. Such areas 15a, 15b of the second acoustic mass layer 15 may range between and include 0.5 mm to 10 mm, and more particularly range from 1 mm to 5 mm, and even more particularly range from 1.5 mm to 3 mm. Furthermore, the chemical makeup of the reaction components may be adapted for the polyurethane reactant components over a range of polyurethane chemistry, which may also include polyurea and hybrids of the two.

For example, the polyurethane for second acoustic mass layer 15 may have the following formulation:

| Components | % by weight |
|---|---|
| Polyol Side | |
| Blend of 1,000 to 4,000 molecular weight poly-glycols | 50 to 95% |
| Glycol or Amine chain extender/cross linkers | 5 to 20% |
| Pigment dispersion | 0.5 to 3% |
| Isocyanate Side | |
| Methylene diphenyl diisocyanate (MDI) (including varients and prepolymers) having a functionality of 2.01 to 2.2 | |
| NCO/OH ratio (index) | 0.25 to 0.5 (85 to 115) |
| Fillers, calcium carbonate and/or barium sulfate | 40 to 70% by weight in the final polymer. Filler may be added to either isocyanate or polyol. |

Fillers such as barium sulfate or calcium carbonate are added to the above polyol formulation at levels of 60 to 90% by weight. However, filler may be blended into either the polyol formulation or the isocyanate prior to the mixhead. The polyol formulation, including fillers is then reacted with an MDI pre-polymer or variant, which may also contain a filler. Cure time of the system ranges from 5 to 30 seconds when sprayed on to tool or substrate. Average functionality of the polyol formulation is between 2.0 and 3.0 with molecular weight range of 2000 to 6000. Functionality of MDI system ranges from 2.01 to 2.3.

The neat polyurethane (i.e. without filler) may have a density in the range of 1.0 to 1.1 g/cc. Physical properties may include:

| | |
|---|---|
| Elongation at yield, ASTM D638 (2010) | 150 to 600% |
| Shore A Hardness, ASTM D2240 (2005) | 50 to 90 |
| Tensile Strength at yield, ASTM D638 (2010) | 4,000 to 6,000 kPA |

Filled polyurethane elastomer system may have an elongation range of 20 to 50%, (DIN ISO 527-3), and a tear strength range of 15 to 30 kN/m, (DIN ISO 34.1). Tensile strength may be in a range of 1 to 10 N/mm$^2$, 9DIN EN ISO 527-3.

Control of the mixheads 40, 46 delivering the reaction components may be is carried out automatically by means of computer control as this is in principle per se known for robot control. As such, control may be adapted quickly to changed conditions, such as the identification of an additional area of high sound generation and transmission to be sound insulated. It is therefore possible, not only to produce large quantities, but accommodate rapid engineering changes to satisfy just-in-time production.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. An acoustic insulator for a motor vehicle comprising:
a mass providing an acoustic barrier, the mass comprising a first acoustic mass layer underlying a second acoustic mass layer;
the first acoustic mass layer provided by a thermoplastic sheet having a thickness in a range of 0.5 mm to 1 mm,
the second acoustic mass layer provided at one or more localized areas formed in place on a backside surface of the first acoustic mass layer to increase an overall thickness of the mass at the one or more localized areas,
a spring layer providing an acoustic absorber overlying the mass, wherein the spring layer is formed in place on a backside of the second acoustic mass layer and the backside of the first acoustic mass layer.

2. The insulator of claim 1 wherein:
the second acoustic mass layer comprises a composition which is spray formed in place on the backside of the first acoustic mass layer at a plurality of localized areas.

3. The insulator of claim 2 wherein:
the second acoustic mass layer spray formed in place on the backside of the first acoustic mass layer is spray formed in place without use of a forming surface other than the backside surface of the first acoustic mass layer.

4. The insulator of claim 2 wherein:
the second acoustic mass layer composition spray formed in place on the backside of the first acoustic mass layer is formed in place from reactive components which react to form a thermoset polymer.

5. The insulator of claim 1 wherein:
the second acoustic mass layer is bonded directly to the backside surface of the first acoustic mass layer.

6. The insulator of claim 1 wherein:
a thickness of the second acoustic mass layer varies to vary localized acoustical properties of the mass according to a sound profile of the motor vehicle.

7. The insulator of claim 1 wherein:
the second acoustic mass layer has a thickness in a range of 1 mm to 10 mm.

8. The insulator of claim 1 wherein:
the spring layer comprises a composition which is spray formed in place on the backside of the first acoustic mass layer and the backside of the second acoustic mass layer.

9. The insulator of claim 8 wherein:
the spring layer spray formed in place on the backside of the first acoustic mass layer and the backside of the second acoustic mass layer is spray formed in place without use of a forming surface other than the backside surface of the first acoustic mass layer and the backside surface of the second acoustic mass layer.

10. The insulator of claim 8 wherein:
the spring layer spray formed in place on the backside of the first acoustic mass layer and the backside of the second acoustic mass layer is formed in place from reactive components which react to form a thermoset polymer.

11. The insulator of claim 9 wherein:
the thermoset polymer is a foam.

12. The insulator of claim 7 wherein:
the spring layer is bonded directly to the backside surface of the first acoustic mass layer and the backside surface of the second acoustic mass layer.

13. The insulator of claim 1 wherein:
the thermoplastic sheet is at least one of vacuum-formed and thermo-formed.

14. The insulator of claim 1 wherein:
the thermoplastic sheet is made of a composition comprising a polymer, wherein the polymer comprises a vinyl acetate polymer or copolymer.

15. The insulator of claim 1 wherein:
the thermoplastic sheet is made of a composition comprising a polymer, wherein the polymer comprises polyvinyl chloride.

16. A method of providing an acoustic insulator for a motor vehicle comprising:
forming a first acoustic mass layer of a mass which provides an acoustic barrier, wherein the first acoustic mass layer is formed by at least one of thermo-forming and vacuum-forming a thermoplastic sheet having a thickness in a range of 0.5 mm to 1 mm;
forming a second acoustic mass layer of the mass in place on a backside surface of the first acoustic mass layer at one or more localized areas to increase an overall thickness of the mass at the one or more localized areas,
forming a spring layer which provides an acoustic absorber overlying the mass, wherein the spring layer is formed in place on a backside of the second acoustic mass layer and the backside of the first acoustic mass layer.

17. The method of claim 16 wherein:
the second acoustic mass layer is spray formed in place on the backside of the first acoustic mass layer at a plurality of localized areas.

18. The method of claim 17 wherein:
the second mass spray formed in place on the backside of the first acoustic mass layer is spray formed in place without use of a forming surface other than the backside surface of the first acoustic mass layer.

19. The method of claim 16 wherein:
the second acoustic mass layer spray formed in place on the backside of the first acoustic mass layer is formed in place from reactive components which react to form a thermoset polymer.

20. The method of claim 16 wherein:
the spring layer is spray formed in place on the backside of the first acoustic mass layer and the backside of the second acoustic mass layer.

21. The method of claim 20 wherein:
the spring layer spray formed in place on the backside of the first acoustic mass layer and the backside of the second acoustic mass layer is spray formed in place without use of a forming surface other than the backside surface of the first acoustic mass layer and the backside surface of the second acoustic mass layer.

22. The method of claim 20 wherein:
the spring layer spray formed in place on the backside of the first acoustic mass layer and the backside of the second acoustic mass layer is formed in place from reactive components which react to form a thermoset polymer.

23. The method of claim 16 further comprising:

changing at least one of a thickness and location of the second acoustic mass layer to change a sound attenuation of the acoustic insulator without modification of any tooling used to produce the acoustic insulator.

24. The method of claim 16 further comprising:

changing a thickness of the spring layer to change a sound attenuation of the acoustic insulator without modification of any tooling used to produce the acoustic insulator.

* * * * *

UNITED STATES PATENT AND TRADEMARK OFFICE
CERTIFICATE OF CORRECTION

PATENT NO. : 8,881,864 B2
APPLICATION NO. : 13/645288
DATED : November 11, 2014
INVENTOR(S) : Matt Starling et al.

It is certified that error appears in the above-identified patent and that said Letters Patent is hereby corrected as shown below:

On the Title page, in item (73), delete "International Automation Components Group North America, Inc.", and insert -- "International Automotive Components Group North America, Inc." --, therefor.

Signed and Sealed this
Fourteenth Day of April, 2015

Michelle K. Lee
*Director of the United States Patent and Trademark Office*